7817X
B. J. Lewis
Tailoring
№
Patented Nov. 19. 1833
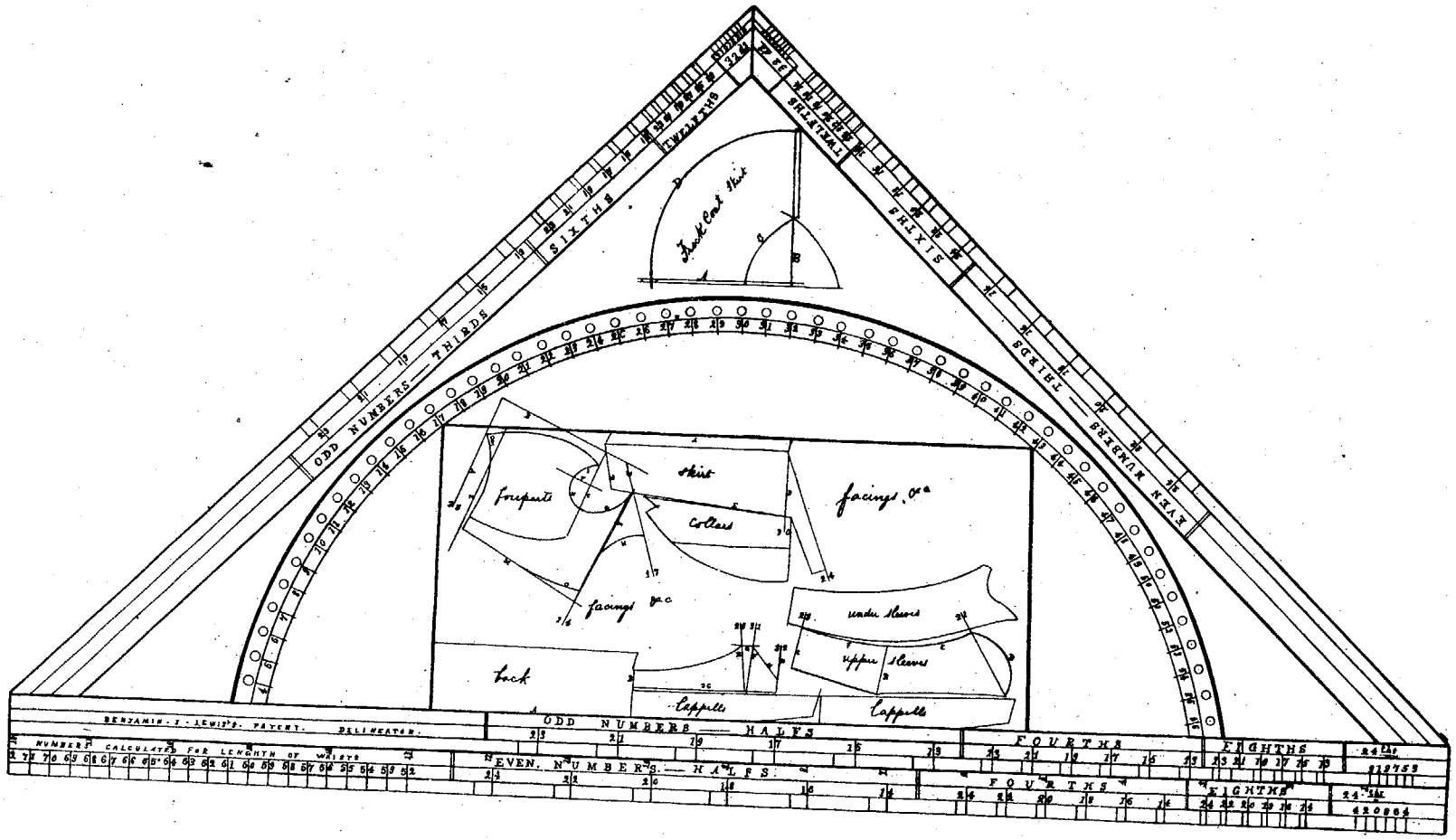

Benjamin F. Lewis — Mount Vernon Ohio.
Letters Patent Dated November 19th 1833
The Schedule referred to in these Letters Patent, and making part of the same containing a description in the words of the said Benjamin F. Lewis, himself of his improvement in the art of cutting out or drafting gentlemen's garments.

---

To all to whom these presents shall come: Be it known that I Benjamin F. Lewis, of Mount Vernon, in the County of Knox, and State of Ohio, have invented a new and useful instrument, made use of in drafting Gentlemens garments, called the Delineator, and that the following is a full and exact description of the construction and mode of using said instrument as invented by me.

1st of its Shape The delineator is right angle triangle, the longest edge being 18 inches long, and the two short edges between 12 & 13 inches long, and is to be used in drafting in the place of a square.

2nd. Of the scale of divisions. The scale of divisions for the different sizes is contained on the three edges of the delineator as follows. They are calculated for 24 different sizes from twenty six inches whole circumference to forty nine of breast or waist measure, and are divided as follows; the whole circumference of a man's breast and waist is taken with an inch measure, and whatever number of inches he may measure round breast and waist, then the half of that number is taken and called the Breast and waist measure; and divided into one half, fourth, eighth and twenty fourth, and again, into one third, sixth, twelfth and thirty second. They are contained on the delineator as follows, the divisions of halves, fourths, eighths and twenty fourths for the different sizes is contained on the right hand end of the longest edge, the even numbers being on the lower edge, and the odd numbers [illegible] above these as designated

[illegible]

[illegible] 7817X on draft being divided by a larger line than those upon which the divisions are placed. The different divisions, that is to say, of halves, fourths &c are separated by large black lines. The divisions of thirds, sixths, twelfths, and thirty seconds are contained on the two short edges of the delineator, the even numbers being on the right hand edge and the odd numbers on the left hand edge as designated on the draft, and the different divisions of thirds, sixths &c are divided, or distinguished by large black lines.

The numbers on the left hand end of the long edge commencing at 18 ending at 18 are to govern the length of waists for different heights; for instance, if a man measure 52 inches in height then 13 inches which is opposite to 52 would be the proper length of waist for such height, or if the man be very round shouldered then it would require to be an inch or an inch and a half longer; on the contrary should he be quite straight or hollow backed then the variation must be reversed and the waist cut proportionately shorter. These numbers also answer for what is called height measure, for instance where the diagrams require such a division of the height measure, then the same number in the division of halves &c is to be used as is opposite the height of the customer, that is, if he be 52 inches high then 13 would be the number to be used for the height measure and so on in such proportion for every other height.

5° Of the Protractor. The protractor is contained within the triangle above described. It is divided into sixty different angles or divisions. ([illegible] each end however, are omitted in consequence of their interfering with the scale of divisions on the longest edge or hypothenuse of the triangle) The centre of the protractor is designated by a notch cut in the lower edge of the delineator, so that from the notch to the division marked 30 degrees forms a right angle with the longest edge of the instrument. The holes at the top ends of the different angles of the protractor (see model) are to admit of making marks on the cloth through them, so that any of the angles therein contained may be obtained if necessary in drafting.

4th. Of the diagrams. The diagrams contained within the circle of the protractor and within a set of lines intended to represent the cloth for a coat, are made to assist young beginners in drafting. By placing them on the delineator the workman can have them always before him in a convenient form. They shew the manner in which the coat is taken out of the cloth in order to produce a good, tasteful and well fitting garment.

5th. Of the Structure of the instrument. My intention at present is to have the lines, figures, diagrams &c engraved and printed on good paper, and fitted for use by having the paper glued or pasted upon a thin board or upon good firm paste board, and the holes punched through at the angles of the protractor as represented in the model. I also contemplate having them constructed of brass copper and wood and the scale of divisions and diagrams given on both sides so as to render it still more substantial and convenient.

6th. Of drafting back for frock or dress coat. Commence at the bottom of your cloth, go up from the bottom on line A, one third of the length of the customer which will give the proper length of skirt or line B. Go in on line B, about one and three fourth inch for back tacking. Then form line C, as represented on draft. Then go up on line C, the one fourth of the height as directed in the waist calculations. Then apply the protractor at top of back and run to an angle of 32 degrees, then form line D as represented. Go out on line D, one twelfth of breast measure with one fourth of an inch added to it for seams. Then come down on line C from line D one fourth of the height measure (being the same number in the divisions of fourths as stands opposite the customers height in the waist calculation) Then apply the protractor and run to an angle of 29 and 31, then form lines E and F as represented. Go out on lines E and and [illegible] one third of breast measure with nearly a quarter of an inch added to it for seams. Then form G and H, lines as shown on drafts. Go out on line B, from line C, one twelfth of waist measure with one fourth of an inch added to it for seams. Then sweep curve I, by the length of waist or the distance from line B to line D. Go out on the bottom of back from line A, one third of waist measure and form line J as represented.

7th Of the <u>fore part</u>, directions for drafting, Commence by squaring the cloth at the bottom opposite to where the back comes out. Then go up from bottom to the lower point of side seam or point 8. one fourth of waist measure. Then apply the protractor and run to an angle of 38 degrees, then form line A, as shown on drafts. Then go out on line A, from point 8, one sixth of the waist measure, with one fourth of an inch added for every inch that the customer measures more round the breast than waist, or a fourth of an inch less he measures more round the waist than breast. Then square line B, from line A, then apply the back to get the proper distance from point 8 to line C, or upper point of side seam. Then square line C from line B, Then go up on line B, from line C, one eight of the height measure. Then apply the protractor and run to an angle of 17 degrees, then form line D, as shown on drafts. Then come up from line B on line D, one fourth of ... - breast measure for the back point of shoulder seam; then apply the back to get the front point of shoulder seam, then apply the protractor at the back point of shoulder seam on line D, and run to an angle of 14 degrees and form line E, as shown on draft. Then come down on line E from line D, one half and one fourth of breast measure with one fourth of an inch added to it, which gives top of breast or top of curve C; and a twelfth more will give the top of line H. Then come out on line C, from line B one fourth of breast measure to line F then come from line H, one sixth

7817X and one fourth of an inch farther for front of scye a arm hole, then go back from front of scye on line C, one third of breast with one half inch added, which gives the upper point of side seam. The curve G is swept by one fourth and one twenty fourth of breast measure. The curve H, is swept by one sixth of breast measure. The curve I, is swept by one fourth of breast measure. The curve J is swept by the distance from the upper point of side seam to the point 8. Then come up from point 8, or lower point of side seam one eighth of waist measure with one fourth of an inch added to it, then form line K parallel with line A, as shown on draft. Then come out on line K, one third of waist measure and sweep curve L with one third of waist measure. Then apply the back at the point 8 and with an inch measure come out on line K, the thickness of waist measure. Then form line M as shown. Sweep curve O, by the length of waist so as to form a regular junction with line M. Sweep curve N by one fourth of breast measure.

8th <u>Of the Dress Coat Skirt</u>. It is taken out of the cloth as represented on draft directly above the fore parts in the following manner. Come in from the edge of the cloth (line A) a sufficient distance for a double or single pleat, as may be required, then measure up from line B, with the back to line C. Then apply the protractor and turn to angles 24 and 30 degrees, then form lines C and D, as shown on draft. Then come out on line D one half of waist measure with half an inch added to it, then come out on line B one third of a waist measure with one half inch added to it, then form line E as shown on draft, come out on line C, from the pleat line the a distance from point 8, on fore parts to the lower end of line M, with one and a half inch added for fullness under the flaps. Then cut the [illegible] part of skirt one inch and a fourth wide, and form it as shown on draft.

9th <u>Of the Sleeves</u>. The sleeves are taken out of the cloth above

7817x the back as shown on draft in front of lapells, in the following
manner. Come down from top of cloth one twenty fourth of
breast measure, then apply the protractor and run to an angle
of 21 degrees and from line A. Go down on line A. one half of breast
measure and one twenty fourth added, then sweep the curve
D with one fourth and one twenty fourth of breast measure.
Then measure down with the inch measure from top of sleeve
to elbow or line B, then to bottom on line C, which is one sixth
and one thirty second of breast measure, from edge of cloth
line C, is got by an angle of 29 degrees. Go out on line C. one
fourth and one thirty second of breast measure. Go out on line B,
one third and one twenty fourth of breast measure. Then from lines
E and E, as shown on draft. The under sides of the sleeves are
cut by the upper sides and hooked in at top on out side seam or
edge: one twelfth of breast measure, and one thirty second at the
inside seam or edge at the top.

10 th. Of the Frock Coat Skirt. The skirt of a Frock Coat is drawn
in the following manner, Commence at the bottom of the
cloth, apply the back and get the proper length on line A. Then go in
from edge of cloth about an inch at top, and one half at bottom, which
is for front facing, then get the size of the fore parts at the waist,
leaving off the width of back, then sweep line C by that size from
the top of skirt or line A, Then sweep line B, by the same size from
where line C, crosses line A, so as to form a juction with line C.
Then square line D, from line A. so as to cross line B and C,
where they come to a junction as shown on draft. Sweep
line E by placing a tape or string in your fingers on line D.
and with a piece of chalk at the other end on bottom of skirt, find
the point on line D, where it will touch the bottom of skirt on A.
and D, lines. then sweep as shown on draft.

10 th. The collars, cuffs, flaps &c. are drafted by patterns to
suit the various fashions. In the instrument of which the

7817X above is a description, I claim to be the inventor and discoverer of the protractor, also the manner of drafting by all the diagrams attached to the instrument, except the diagram of the Frock coat skirt. Also the addition of the thirty seconds to the scale of divisions, and also the form of the <u>instrument</u> as well as the combination of numbers calculated for height and waist.

Witnesses
Henry B. Curtis
Edson Hartnep.

Benjamin I. Lewis (2772 wds.)

Rec.^d & Recorded anew August 13. 1842. & Exd. W.J.C.